(12) United States Patent
Kurian et al.

(10) Patent No.: US 9,515,957 B2
(45) Date of Patent: Dec. 6, 2016

(54) SERVER RATING SYSTEM FOR AUTHORIZING AND ENTITLING SERVERS TO TRANSFER DATA

(71) Applicant: BANK OF AMERICA CORPORATION, Charlotte, NC (US)

(72) Inventors: Manu Jacob Kurian, Dallas, TX (US); Sorin N. Cismas, Addison, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 63 days.

(21) Appl. No.: 14/596,979

(22) Filed: Jan. 14, 2015

(65) Prior Publication Data

US 2016/0205035 A1    Jul. 14, 2016

(51) Int. Cl.
*H04L 12/911*    (2013.01)
*H04L 29/08*     (2006.01)
*H04L 29/06*     (2006.01)

(52) U.S. Cl.
CPC ........... *H04L 47/783* (2013.01); *H04L 63/102* (2013.01); *H04L 67/1085* (2013.01); *H04L 67/322* (2013.01); *H04L 69/26* (2013.01)

(58) Field of Classification Search
CPC .................................................. H04L 47/783
USPC ............................................................ 726/4
See application file for complete search history.

(56) References Cited

U.S. PATENT DOCUMENTS

2008/0133761 A1* 6/2008 Polk .................... H04L 63/0428
                                                      709/228

FOREIGN PATENT DOCUMENTS

GB    EP 0409397 A2 *  1/1991  ........... G06F 21/606

* cited by examiner

*Primary Examiner* — Jacob Lipman
(74) *Attorney, Agent, or Firm* — Michael A. Springs; Moore & Van Allen PLLC; James C. Edwards

(57) ABSTRACT

Management over data movement/transfer is accomplished by employing a data transmission rating system that assigns a data transmission rating to each server in the enterprise-wide communication network and subsequently makes determinations as to whether a data connection can be established between two or more servers based on the assigned data transmission rating. The enterprise-wide servers may be assigned a primary data transmission rating based on the type of data that the server is authorized to exchange and, optionally, the servers are assigned a secondary data transmission rating, (or a tertiary rating and so on) based on the geographic/physical location of the server. In this regard, in order for a data connection to be established between the two or more servers, the primary rating, and in those embodiments that implement a secondary rating, a tertiary rating and so on, must be determined to be authorized for establishing a data connection.

20 Claims, 4 Drawing Sheets

SERVER RATING SYSTEM FOR AUTHORIZING AND ENTITLING SERVERS TO TRANSFER DATA

FIELD

In general, embodiments of the invention relate to network data communication and, more particularly, a data transmission server rating system for authorizing and entitling servers to transfer data and/or conduct transactions within an enterprise computing network.

BACKGROUND

In large enterprise businesses, different software systems (otherwise referred to as applications, modules and the like) are deployed for the purpose of carrying out prescribed actions. For example, an enterprise may deploy one or more software systems to monitor the health of the computing system, one or more other software systems to move data throughout the enterprise and one or more other software systems for messaging. All of these software systems are stacked on the servers within the enterprise to carry out the request functionality. Each of these software systems are generally independent of each other; i.e., different commercial manufacturers and/or execute under different operating systems. As such, these diverse software systems require a high degree Information Technology (IT) support and maintenance to ensure that the systems are capable of working in unison. Additionally, each of these independent software systems implement distinct tracking controls and governance, which further increase maintenance costs.

Additionally, software systems that are deployed for the purpose of moving data (i.e., transferring data files, conducting transactions and the like) are not only specific as to Operating Systems (OSs) and manufactures, but also require that the user have access/entitlement at the server-level. Such access entitlement at the server-level is problematic from a data movement standpoint as well as a security standpoint. From the data movement standpoint the user can only transfer data from servers to which the user has been granted access/entitlement. From the security standpoint, once the user is granted access to a server, the user is not typically limited in terms of actions on that server and, as such, may move, or even delete, any data files stored on the entitled server (even though such data files were not the basis for granting the user access/entitlement.

Traditionally, the ability to transfer data and/or conduct transactions within an enterprise or any other network community is at the user and/or device level. This means that users, such as employees or the like are granted permission, otherwise referred to as entitlements to transfer data and/or conduct transactions. The user may be an individual, a system or the like. Entitlements may be configured to provide for a user to access specific systems, network devices or the like and/or for a user to be blocked from accessing specific systems, network devices or the like. However, if a user is entitled to access a server, the user has access at the server/device level and, as such, the user may be free to exploit vulnerabilities at the server level (e.g., access data that the user is not entitled to access, move/ export data outside of the enterprise that the user is not authorized to move and the like).

Therefore, a need exists to develop systems, apparatus, computer program products, methods and the like that for a unified and comprehensive software deployment system that is extensible and provides one methodology for accessing Operating Systems (OSs) and all of the servers deployed throughout an enterprise. In this regard, the desired system should provide a holistic and enterprise-wide solution for data movement (i.e., transferring data from one enterprise server to another enterprise server, conducting transactions between servers and the like). Moreover, the unified nature of the desired system should allow for centralized control of the movement of data.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for a technology-agnostic and protocol-agnostic system for delivering services including data movement/transfer within an enterprise. The embodiments herein described provide for a modular system that is easy and cost-effective to deploy and is extensible, such that as new services are warranted, additional modules can readily be added to the system. The technology/OS-agnostic nature of the system means that any server, regardless of manufacturer or OS, can be assimilated into the system for the purpose of sending and/or receiving data. Moreover, the protocol-agnostic aspect of the system means that data can be transferred/ communicated using any known, or future known, protocol (without requiring a separate application specific to the desired protocol).

In addition, the system herein described provides for a comprehensive and unified approach to data movement/ transfer within an enterprise. As such, the integrated system, in addition to providing for data movement transmissions/ transactions, also provides for unified governance control over the movement of data, unified tracking of data movement across the enterprise, unified auditing processes, granularity of control at the file level and the like.

In specific embodiments, the system herein described provides for management over data movement/transfer by employing a data transmission rating system that assigns a data transmission rating to each server in the enterprise-wide communication network and subsequently makes determinations as to whether a data connection can be established between two or more servers based, at least in part, on the assigned data transmission rating. In specific embodiments of the invention the servers are assigned a primary data transmission rating based on the type of data (e.g., public, aggregated, highly sensitive, non-public, restricted and the like) that the server is authorized to exchange. In other embodiments of the invention, the servers are assigned a secondary data transmission rating based on the geographic/ physical region/location of the server (e.g., the country where the server is located). In further embodiments, other tertiary data transmission ratings, and so on, may be assigned based on other characteristics of the server or the data being transferred/transaction occurring. In this regard, in order for a data connection to be established between the two or more servers, the primary rating, and in those embodiments that implement a secondary rating a tertiary rating and so on, must be determined to be compatible.

In additional embodiments of the invention, the management over data movement/transfer may include determining if the user has permission to establish the data connection. It should be noted that the user permissions/entitlements are established at the data movement/transaction application-level and, as such, does not require the user to be entitled at the server-level. The application-level permissions/entitlements granted to the user may be server-specific, date/time-specific or the like. By creating a system whereby users are authorized to transfer data throughout an enterprise absent the need for server-level entitlement provides for a much more efficient and streamlined approach, which eliminates the need for the user to be granted entitlement and to thus log-in into each server that the user transfers data from or conducts transactions from. In addition, since the user has access at the application-level as opposed to the server-level, the system of the present invention is less vulnerable from a security standpoint (i.e., the user is only authorizes to transfer prescribed data and does not have further access to that data or any other data stored or accessible from that server).

A system for transferring data and conducting transactions amongst a network of enterprise-wide servers defines first embodiments of the invention. The system includes a distributed network of servers, wherein each server has an assigned data transmission rating. The system further includes an operating system-agnostic, modular-based, service delivery application that is stored in network memory and executable by a processor. The service delivery application includes a data transfer module configured to establish data connections between a plurality of servers in the enterprise. Further, the system includes a service delivery management application that is stored in network memory and executable by a processor. The service delivery management application is configured to manage services delivered by the service delivery application, including manage assignment of data transmission ratings to each of the servers and determine whether a data connection can be established between two or more of the servers for transferring data or conducting a data transaction based at least on the data transmission rating assigned to the servers.

In specific embodiments of the system, each server in the distributed network of servers includes a primary data transmission rating that is based on a type of data that the server is authorized to exchange. The type of data may include, but is not limited to, public data, aggregated data, highly sensitive non-public data, restricted data and the like. In other related embodiments of the system, servers in the distributed network of servers may include a secondary data transmission rating that is based on a physical/geographic location (e.g., a country/region) of the server. In such embodiments of the system the service delivery management application may be further configured to determine whether a data connection can be established between two or more of the servers based on compatibility of both the primary transmission rating and the secondary transmission rating.

In further embodiments of the system, the service delivery management application is further configured to manage assignment of data transmission ratings including revoking a rating in automatic response to determining that the server is non-compliant or vulnerable (e.g., currently executing an outdated revision of an application/software or the like).

In still further embodiments of the invention, the service delivery management application is further configured to determine whether the data connection can be established between two or more of the servers based on permissions granted to a user of the data transfer module at a data transfer application level. In such embodiments of the system, the permissions granted to the user may be data type-specific, server-specific, time-specific or the like. As such, by providing for user permissions/entitlements at the application-level, present embodiments of the system provide for data connections to be established and for data to be transferred absent the user requiring entitlement at a server-level.

Moreover, according to further embodiments of the system, the service delivery management application is further configured to assign a protocol for the data connection established between the two or more servers, wherein the protocol assigned may be based on the type of data being transferred, the data transmission rating of the servers and any other relevant criteria for assigning a protocol.

An apparatus for transferring data and conducting transactions amongst a network of enterprise-wide servers defines second embodiments of the invention. The apparatus includes a computing platform including a memory and at least one processor. The apparatus further includes an operating system-agnostic, modular-based, service delivery application that is stored in the memory and executable by the processor. The data transfer module is configured to establish data connections between a plurality of servers in the enterprise. The apparatus further includes a service delivery management application that is stored in the memory and executable by the processor. The service delivery management application is configured to manage services delivered by the service delivery application, including manage assignment of data transmission ratings to each server in the network of enterprise-wide servers and determine whether a data connection can be established between two or more of the servers for transferring data or conducting a data transaction based at least on the data transmission rating assigned to the servers.

In specific embodiments of the apparatus, the service delivery management application is further configured to manage assignment of data transmission ratings including assigning each server a primary data transmission rating that is based on a type of data that the server is authorized to exchange. The type of data may include, but is not limited to, public data, aggregated data, highly sensitive non-public data and restricted non-public data and the like. In other related specific embodiments of the apparatus, the service delivery management application is further configured to manage assignment of data transmission ratings including assigning to some, if not all, of the servers a secondary data transmission rating that is based on a physical location of the server. In such embodiments of the apparatus, the service delivery management application is further configured to determine whether a data connection can be established between two or more of the servers based on compatibility of both the primary transmission rating and the secondary transmission rating.

In other specific embodiments of the apparatus, the service delivery management application is further configured to manage assignment of data transmission ratings including revoking a rating in automatic response to determining that the server is non-compliant or vulnerable (e.g., currently executing an outdated revision of an application/software or the like).

In still further specific embodiments of the apparatus, the service delivery management application is further configured to determine whether the data connection can be established between two or more of the servers for transferring data or conducting a data transaction based on permissions granted to a user of the data transfer module at a data transfer application level. In such embodiments of the invention the permissions granted to the user may be data type-specific, server-specific, time-specific or the like. As such, by providing for user permissions/entitlements at the application-level, present embodiments of the system provide for data connections to be established and for data to be transferred absent the user requiring entitlement at a server-level.

A computer program product including a non-transitory computer-readable medium defines third embodiments of the invention. The computer-readable medium includes a first set of codes for causing a computer to manage assignment of data transmission ratings to each server in a network of enterprise-wide servers, including assigning each server a primary data transmission rating that is based on a type of data that the server is authorized to exchange. Further, the computer-readable medium includes a second set of codes for causing a computer to determine whether a data connection can be established between two or more of the servers, for a purpose of transferring data or conducting a data transaction, based at least on the data transmission rating assigned to the servers.

Thus, systems, apparatus, methods, and computer program products herein described in detail below provide for management over data movement/transfer by employing a data transmission rating system that assigns a data transmission rating to each server in the enterprise-wide communication network and subsequently makes determinations as to whether a data connection can be established between two or more servers based, at least in part, on the assigned data transmission rating. In specific embodiments of the invention the servers are assigned a primary data transmission rating based on the type of data that the server is authorized to exchange. In other embodiments of the invention, the servers are assigned a secondary data transmission rating based on the geographic/physical region/location of the server (e.g., the country where the server is located). In still further embodiments the rating system may implement tertiary ratings and so on, which are associated with other characteristics of the server and/or data being exchanged/transaction being conducted. In this regard, in order for a data connection to be established between the two or more servers, the primary rating, and in those embodiments that implement a secondary rating, a tertiary rating and so on, must be determined to be compatible.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
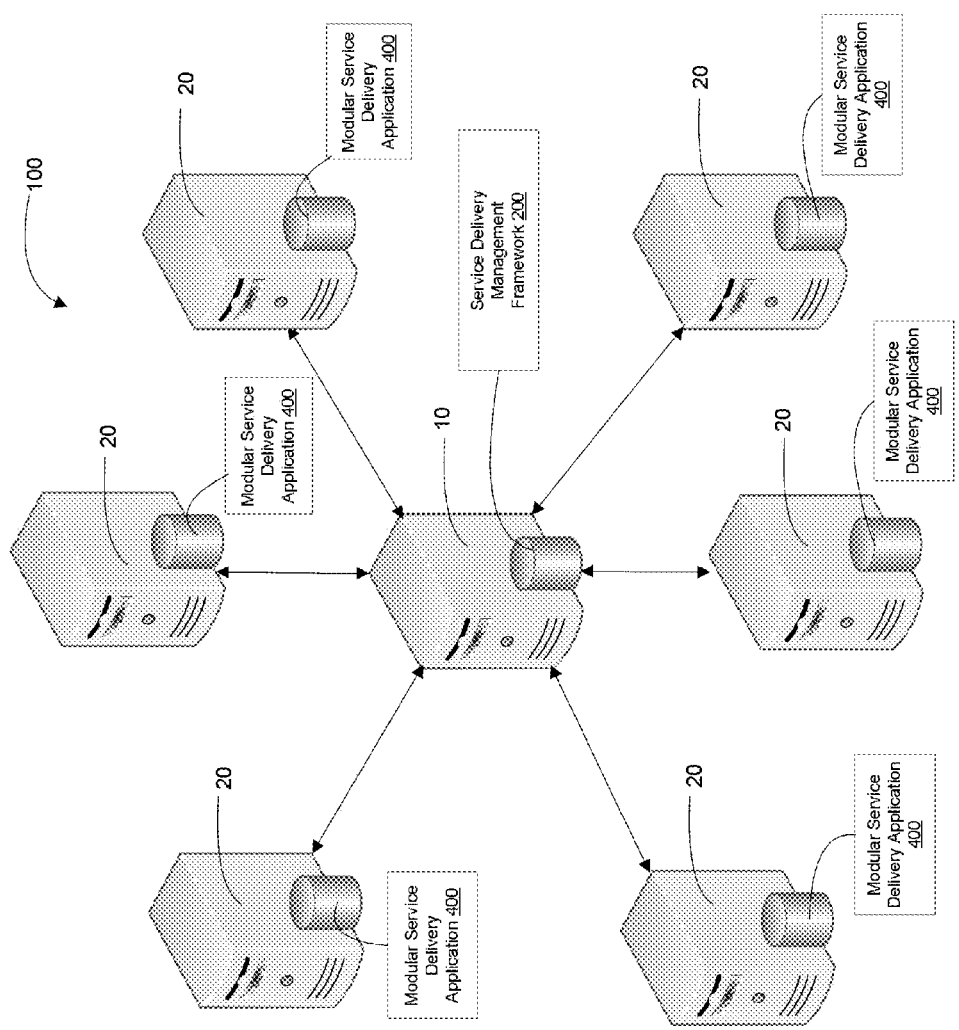
Figure 2:
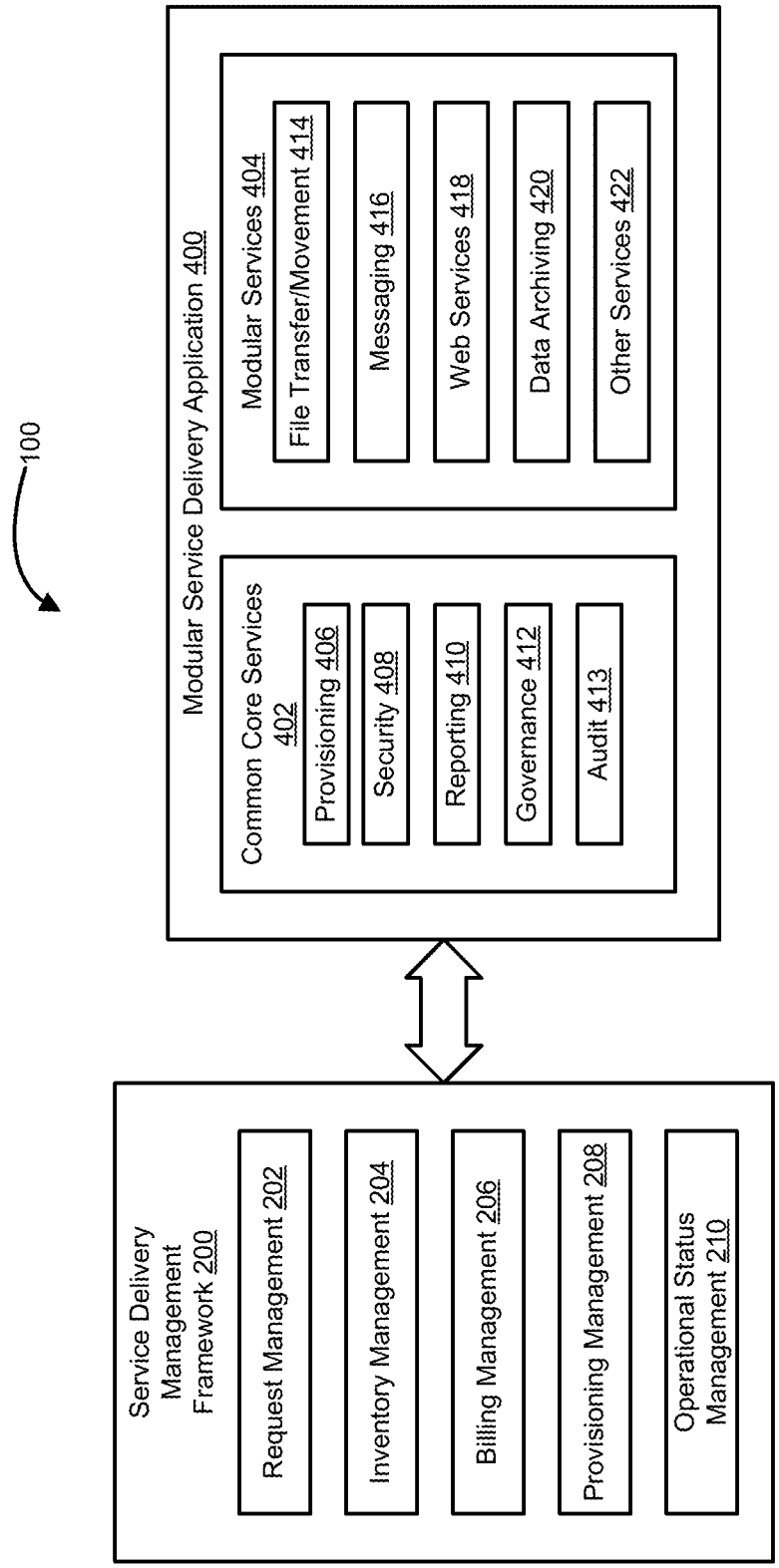
Figure 3:
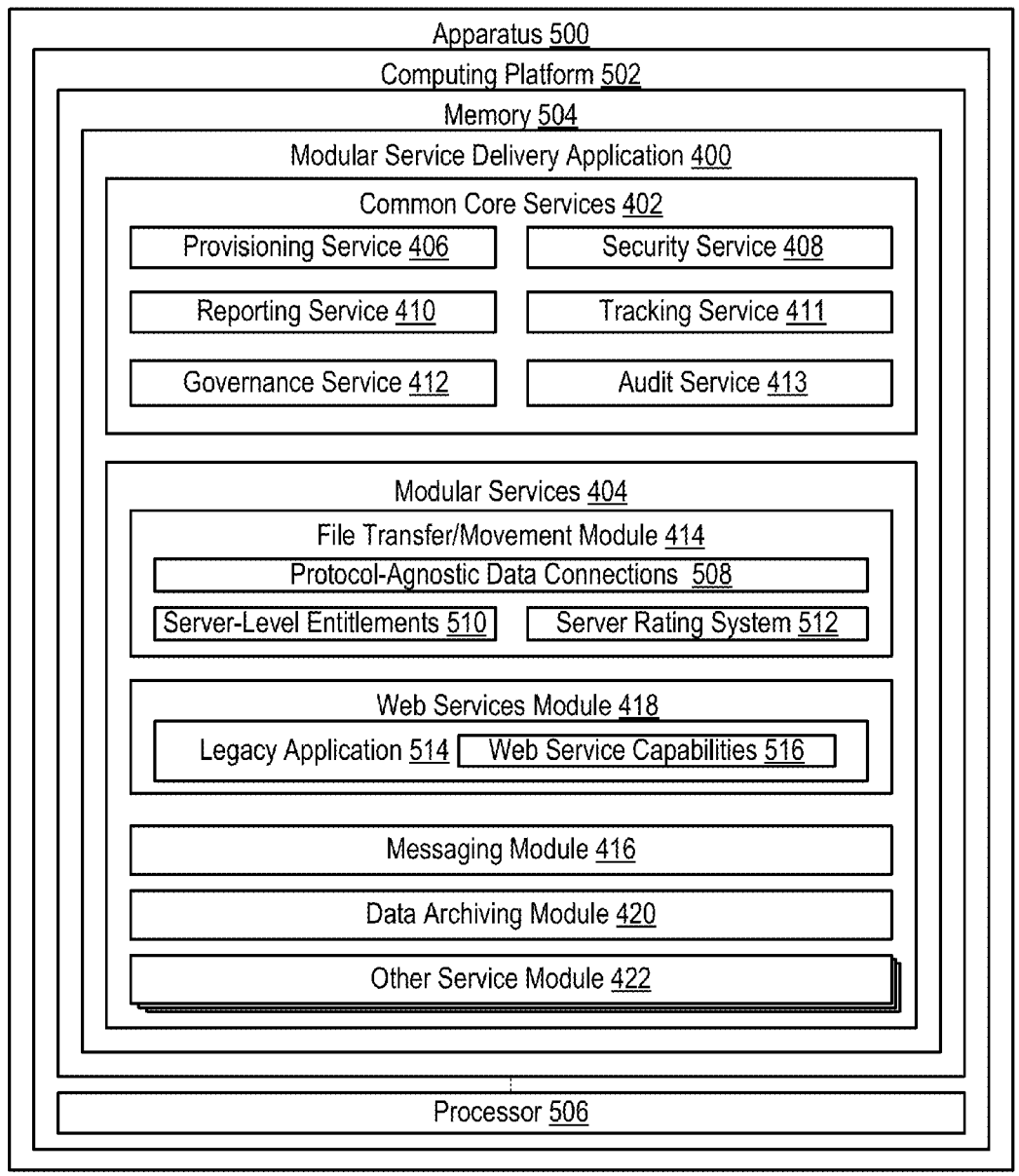
Figure 4:
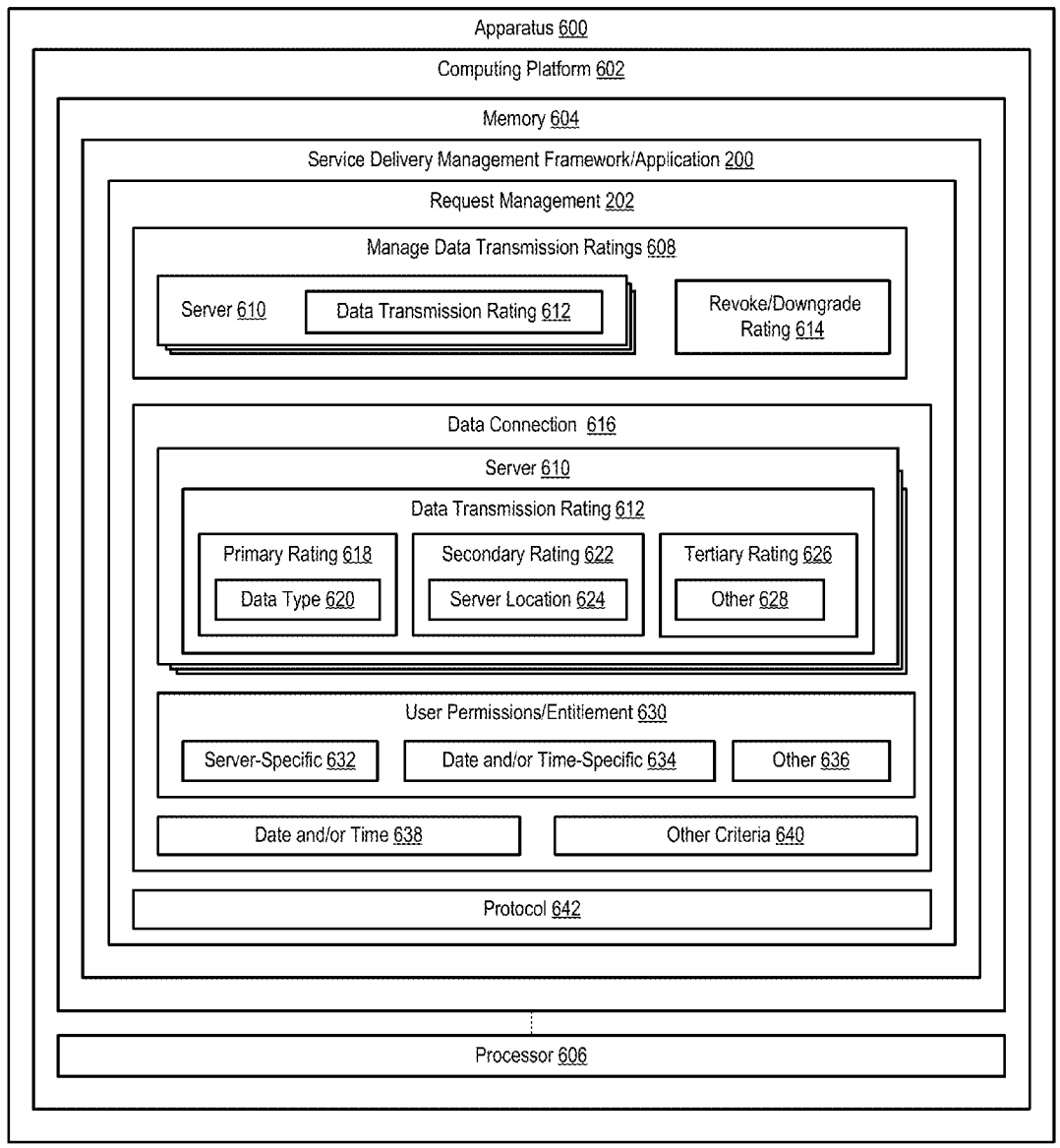

Having thus described embodiments of the invention in general terms, reference will now be made to the accompanying drawings, which are not necessarily drawn to scale, and wherein:

FIG. 1 provides a schematic diagram of a system for enterprise-wide service delivery including data movement/transfer and related management, in accordance with embodiments of the present invention;

FIG. 2 provides a block diagram of a system for enterprise-wide service delivery including data movement/transfer and related management, in accordance with embodiments of the present invention;

FIG. 3 provides a block diagram of the apparatus configured for an extensible module system including technology/OS-agnostic and protocol-agnostic data movement, in accordance with embodiments of the present invention; and FIG. 4 provides a block diagram of an apparatus configured for service delivery management framework including file transfer/movement request management, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for a technology-agnostic and protocol-agnostic system for delivering services, including data movement/transfer within an enterprise. The embodiments herein described provide for a modular system that is easy and cost-effective to deploy and is extensible, such that as new services are warranted, additional modules can readily be added to the system. The technology/OS-agnostic nature of the system means that any server, regardless of manufacturer or OS, can be assimilated into the system for the purpose of providing the services including sending and/or receiving data. Moreover, the protocol-agnostic aspect of the system means that data can be transferred/communicated using any known, or future known, protocol (without requiring a separate application specific to the desired protocol). As such the present invention eliminates the need to utilize, maintain and configure compatibility amongst numerous OS-specific and/or protocol-specific applications for delivering such services, such as numerous data transfer applications and the like.

In addition, the system herein described provides for a comprehensive and unified approach to managing the services provided by the modular service delivery system. As such, the integrated system, in addition to providing the services, such as data movement transmissions/transactions, messaging, web services and the like also provides for unified governance control over the services, unified tracking of the services across the enterprise, unified auditing processes, granularity of control and the like. Such unified management control over the services eliminates the need to implement disparate security rules/processes, governance procedures, auditing practices and the like.

Specifically, one of the unified management services provided by the present invention provide for provides for management over data movement/transfer by employing a data transmission rating system that assigns a data transmission rating to each server in the enterprise-wide communication network and subsequently makes determinations as to whether a data connection can be established between two or more servers based, at least in part, on the assigned data transmission rating. In specific embodiments of the invention the servers are assigned a primary rating based on the type of data (e.g., public, aggregated, highly sensitive, non-public, restricted and the like) that the server is authorized to exchange (i.e., transmit and/or receive). In other embodiments of the invention, the servers are assigned a secondary rating based on the geographic/physical region/location of the server (e.g., the country where the server is located). In further embodiments, other tertiary ratings, and so on, may be assigned based on other characteristics of the server or the data being transferred/transaction occurring. In this regard, in order for a data connection to be established between the two or more servers, the primary rating, and in those embodiments that implement a secondary rating, a tertiary rating and so on, must be determined to be compatible.

In additional embodiments of the invention, the management over data movement/transfer may include determining if the user (i.e., individual user or system user) has permission to establish the data connection. It should be noted that the user permissions/entitlements are established at the application-level (i.e., the data movement module-level) and, as such, does not require the user to be entitled at the server-level. The application-level permissions/entitlements granted to the user may be server-specific, date/time-specific or specific to any other defined criteria related to the transmission or the transaction. By creating a system whereby users are authorized to transfer data throughout an enterprise absent the need for server-level entitlement, the present invention provides for a much more efficient and streamlined approach, which eliminates the need for the user to be granted entitlement and to, thus, log-in into each server that the user transfers data from or conducts transactions from. In addition, since the user has access at the application-level as opposed to the server-level, the system of the present invention is less vulnerable from a security standpoint (i.e., the user is only authorizes to transfer prescribed data and does not have further access to that data or any other data stored or accessible from that server).

Referring to FIG. 1, a schematic diagram is provided of a system 100 for providing technology/OS-agnostic and protocol-agnostic delivery of services within an enterprise. The system 100 is configured as a hub-and-spoke model, in which the hub server 10 provides for management of the service delivery system via service delivery management framework 200 and the spoke servers 20, implemented throughout the enterprise, are deployed with a modular service delivery application 400. The service delivery application 400 is an open source based web services application and, as such, can be deployed and/or executed on any type of server (technology-agnostic) executing any type of operating system (OS-agnostic). The modular nature of the application means that the service delivery system is extensible; as additional services are added new modules within the application 400 may be added/plugged-in into the application 400. As such, the present invention provides a holistic approach to service delivery that results in an enterprise-wide solution for service delivery.

In specific embodiments of the invention, the service delivery application 400 includes a data movement/file transfer module (shown and described in FIGS. 2 and 3) that is configured to provide protocol-agnostic file transfer/transactions capabilities throughout the enterprise. Since the file transfer/data movement is configured as an open source application that is protocol-agnostic, deployment and use of data movement/file transfer module throughout most, if not all, of the enterprise's servers eliminates the need to deploy, maintain and configure compatibility amongst multiple different protocol-specific file transfer applications. In specific embodiments of the invention, the data movement/file transfer module relies on File Transfer Protocol Software (FTPS) that adds support for Transport Layer Security (TLS) and Secure Sockets Layer (SSL) encryption protocols.

Service delivery application 400 provides uniform management for all of the services delivered by service delivery application 400. In this regard, service delivery application 400 includes core services that act as a unifier to provide umbrella-like management over security, governance (approvals and exceptions), provisioning (new modules and revisions to modules), auditing, tracking, reporting and the like. Such uniformity in management provides efficiency and eliminates the need to resolve conflicts that arise in disparate applications having distinct security, governance, provisioning protocols, rules and regulations. For example, from a security perspective when individual protocol-specific data transfer applications are executed by an enterprise, each application will typically require a separate SSL (Secure Socket Layer) certificate to exist on each server; however, the present invention is configured such that only a single SSL certificate per server and the single SSL certificate can be used to authenticate all of the services delivered by the application 400. It should be noted that while the system only requires a single SSL certificate per server, the application 400 is configured to accommodate multiple SSL certificates if the application or a module within the application warrants such.

According to specific embodiments of the invention, service delivery management framework 200 includes applications and/or the like configured to manage services delivered by the service delivery application 400, including management over the transmission/movement of data/conducting of transactions. Such management includes managing assignment of data transmission ratings to each of the servers and determine whether a data connection can be established (i.e., whether data can be transmitted and/or transactions conducted) between two or more of the servers based at least on the data transmission rating assigned to the servers. In specific embodiments of the invention, a primary server rating is based on the type of data that the server is authorized to exchange. In other embodiments of the invention secondary, tertiary and so server ratings may be implemented to further determine whether servers are authorized/compatible for data exchange. In specific embodiments of the invention, a secondary server rating is based on the physical/geographic location (i.e., country/region) of the server. Ratings based on physical/geographic location take into account that countries (or regions) may have certain laws/regulations in place that restrict data movement outside of the country. For example, certain countries may prohibit NPI data from being transmitted to another country and/or received from another. In those embodiments in which the rating system includes different classification of server ratings (i.e., secondary, tertiary and so on in addition to a primary classification) each of the classifications must be determined to be compatible in order for data exchange to be authorized.

Referring to FIG. 2, a block diagram is presented of a system 100 configured for providing technology/OS-agnostic and protocol-agnostic delivery of services within an enterprise, in accordance with an embodiment of the present invention. The system 100 includes modular service delivery application 400 that includes common core services 402 and modular services 404. The core services 402 are common to all of the modular services 404 in the application and provide for unified umbrella-like management of the modular services. The core services may include, but are not necessarily limited to, provisioning 406, security 408, reporting 408 and governance/auditing 410.

The provisioning service 406 is configured to provide for uniform deployment of new modular services 404 and deployment of revisions/updates to existing modular services 404. In addition, provisioning service 406 is configured to provide hierarchical ordering of deployment based on criticality (i.e., server level), compliance and the like. Moreover, provisioning service 406 is configured to schedule deployment updates/revision and/or new modules so as to limit the impact of the deployment on production use of the server and/or other associated resources. Additionally, provisioning service 406 is configured to allow for non-compliant versions to be deployed with proper recordation/logging in place and for emerging or non-compliant versions to be declined.

The security service 408 provides uniform control over the security features applicable to the modular services 404. In this regard, the security service 408 provides uniform rules, regulations and procedures for security. For example, uniform rules related to authenticating a protocol/module, uniform rules associated with encryption, uniform rules for resolving a security conflict or the like.

The reporting service 410 provides uniform control over reporting functions associated with the modular services. For example, uniform control over what reporting is required, the contents of reports, parties receiving reports, actions that may result in alerts/notifications, parties receiving notification/alerts and the like.

The governance service 412 and audit service 413 provides uniform control over governance and auditing features applicable to the modular services. In this regard, the governance service 412 and audit service 413 provides uniform rules, regulations and procedures for rules exceptions, approval chains for granting exceptions, auditing procedures, auditing schedules and the like.

The modular services 404 provided by service delivery application 400 may include, but are not limited to, file transfer/movement module 414, messaging module 416, web services module 418, data archiving module 420 and any other service module 422.

File transfer/movement module 414 provides a unified open-source approach to moving data (e.g., file transfers, conducting transactions and the like) to and from devices (e.g., servers) deployed in the enterprise. The file transfer/data movement module 414 is configured to provide one consolidated methodology for accessing different operating systems and networked devices to move data to and from networked devices. As such, the file transfer/data movement module 414 provides a full-service, holistic approach that can be implemented enterprise-wide; obviating the need to deploy and maintain numerous disparate protocol and operating system-specific file transfer applications. In specific embodiments of the invention, the file transfer/movement module 414 is configured to provide a web-accessible view to manage file transfer/data movement, as well as track/monitor the movement of data within the enterprise in real-time or near real-time.

In specific embodiments of the invention, the file transfer/movement module 414 is configured to provide for data movement/file transfer at the device-level and/or at the application-level, such that data can be moved from one networked device to another, from one networked device to an application, or from one application to another application. In further specific embodiments of the invention, the file transfer/data movement module 414 relies on the request management 202 function of the service delivery management framework 200 to provide a requisite protocol for file transfer, thus, eliminating the need to locate and implement a secondary network device to perform protocol-agnostic data movement/file transfer. As a result complexity and overhead are significantly reduced.

Moreover, in additional embodiments of the invention, the file transfer/movement module 414 is configured to provide entitlements at the server-level or at the data-level, as opposed to granting entitlements at the user-level. In this regard, the file transfer/module 414 looks at whether movement of data is permissible from device-to-device and/or application-to-application. A user is granted access to the file transfer/movement module 414 and may be pre-configured to perform certain actions within the file transfer/movement module 414 (i.e., the user has access at the application/module-level and may be provided granular access to perform specific actions only). If two network devices and/or two applications are configured so to be entitled for data transfer (i.e., entitled for a data connection/file transfer) any module user, pre-configured to use the module and perform the requisite function, can request data movement/file transfer between the devices and/or applications. In this regard, unlike conventional, file transfer applications, the user is not required to have nor are they provided physical access to the devices from which data is communicated and/or received. As a result, the devices from which the data is communicated and received remain secure throughout the data movement/file transfer/transaction process, since the user does not have physical access to the devices and, therefore, does have access to other files/data stored on those devices (e.g., exploit vulnerabilities associated with having to log-on to the servers/devices).

In additional embodiments of the invention, the file transfer/movement module 414 is configured to implement a device/server rating system as a means of determining whether the devices are entitled for a data connection (e.g., whether the devices can exchange data/conduct transactions or the like). In specific embodiments of the invention, the rating system may be based on the type of data that a device is configured to send or receive (e.g., confidential data, proprietary data, public data and the like). In other specific embodiments of the invention, a secondary rating may be provided to account for the geographic location of the device within the enterprise (taking into account that certain geographic locations/countries may have rules/laws in place restricting the type of data that may be communicated/received within the countries geographic locale/boundaries).

Messaging module 416 provides a unified open-source approach to message brokering/queuing. The messaging module may comprise message-oriented middleware that supports sending and receiving messages between distributed systems. The messaging module allows application modules to be distributed over heterogeneous platforms and reduces the complexity of developing applications that span multiple operating systems and network protocols. The module 416 creates a distributed communications layer that insulates the module from specifics of operating systems and network interfaces. As such, the messaging module 414 provides a full-service, holistic approach that can be implemented enterprise-wide; obviating the need to deploy and maintain numerous disparate protocol and operating system-specific messaging applications.

Web services module 418 is configured to provide a unified open-source approach to enabling legacy applications that do not include web services with web services capabilities. In this regard, the web service module 418 communicates with the legacy application to create a web services interface and/or provide a web browser. The web services module 418 is configured to provide one consolidated methodology for accessing different operating systems and networked devices enable legacy applications with web services capabilities. As such, the web services module 418 provides a full-service, holistic approach that can be implemented enterprise-wide; obviating the need to deploy and maintain numerous disparate protocol and operating system-specific web services applications.

Data archiving module 420 is configured to provide a unified open-source approach to data archiving. The data archiving module 420 is configured to provide one consolidated methodology for accessing different operating systems and networked devices to archive data. As such, the data archiving module 420 provides a full-service, holistic approach that can be implemented enterprise-wide; obviating the need to deploy and maintain numerous disparate protocol and operating system-specific data archiving applications.

Additionally, service delivery application 404 may include other known or future-known service modules 422, which can be configured to provide a consolidated methodology for accessing operating systems and network devices to perform the desired service.

Service delivery management framework 200 is a web services framework which serves to integrate and connect the services provided by the service delivery application 400. Service delivery management framework 200 is extensible and may be configured, in specific embodiments to include, request management 202, inventory management 204, billing management 206, provisioning management 208 and operational status management 210. As previously discussed, request management 202 is configured to manage a request to deliver a service provided by service delivery application 400, include a request to move data/transfer a file or the like. Request management 202 may include configuring the service, verifying security and compliance, verifying/receiving requisite approval chain and the like.

Additionally, request management 202 is configured implement the data transmission rating system to determine whether a data connection is authorized to be established between two or more of the servers based on the rating assigned to the servers. In specific embodiments, request management 202 will receive a request to exchange data between specified two or more servers and, subsequently, determine if the servers are authorized to exchange data based on the rating. If the two or more servers are not compatible for data exchange, request management 202 may suggest two or more servers that are compatible for data exchange. In other embodiments of the invention, request management 202 will receive a request, which does specify the servers but includes data exchange criteria (e.g., locations, type of data and the like) and, subsequently, determine two or more servers that are compatible for the data exchange based on the ratings.

As previously discussed, the data transmission server rating system may provide for a primary rating that is based on the type of data that the server is authorized to exchange (i.e., receive and/or transmit). In specific embodiments of the invention, a lowest rated server may associated with public data exchange, while a highest rated server may be associated with restricted/highly sensitive non-public data exchange. For example, the rating system may assign ratings "1" through "9" based on type of data that the server is authorized to exchange. A server rating of "1" may be assigned to servers that are the least secure, i.e., servers that can only exchange public data, and a server rating of "9" may be assigned to servers that are the most secure, i.e., servers that are authorized to exchange restricted, non-public information (NPI) data. In such an example, a server rated "9" may receive data from any server with a rating of "1" through "9" but is not authorized to transmit data to a server rated "1" through "8". Conversely, a server rated "1" may send data to any server rated "1" through "9" but is not authorized to receive data from any server other than a server rated "1". In this regard, if a server is rated "4", that server can receive data from any server with a rating of "1" through "4" and can transmit data to any server with a rating of "4" through "9".

Further, the data rating system may provide for further classifications within the rating system, such as secondary, tertiary and so on ratings that further differentiate servers in terms of their ability to establish a data connection (i.e., exchange data). As previously noted, in specific embodiments of the invention, a secondary rating is based on the physical/geographic location of the server. Ratings based on physical/geographic location take into account that countries (or regions) may have certain laws/regulations in place that restrict data movement outside of the country. For example, certain countries may prohibit NPI data from being transmitted to another country and/or received from another. For example, using the primary rating scheme described above, two servers may have a primary rating of "9", with the first server having a secondary rating of "a", which is associated with a server located in the United States and the second server having a secondary rating of "b", which is associated with a server located in the United Kingdom. By rule, servers located in the United States and rated "9" that are associated with restricted non-public data cannot exchange data with other servers rated "9" that are located outside of the United States. In such an example, the server rated 9a cannot transmit data to the server rated 9b nor receive data from the server rated 9b. Thus, as previously noted and as shown in the example, in those embodiments in which the rating system includes different classification of server ratings (i.e., secondary, tertiary and so on in addition to a primary classification) each of the classifications must be determined to be compatible in order for data exchange to be authorized.

Additionally, request management 202 may be configured to manage data transmission server ratings, such that a rating may be automatically revoked in response to determining that the server is non-compliant or otherwise vulnerable. For example, if the server is not executing the current revision of the security software or the like, the server may be marked as not in good standing for its rating (i.e., the rating is temporarily revoked or the server is downgraded to a lower rating).

Further request management 202 may be configured to determine whether a data request can be established based on other predetermined criteria, such as user permissions, date/time and the like. As previously discussed, user permissions are preconfigured at the application level (e.g., modular service delivery application 400, and, more specifically, the file transfer/movement modular 414) and, since the user does not actually access the servers that exchange data, the user is not required to be entitled at the server-level (i.e., no need to set-up, and maintain individual entitlements at the server-level). User permissions/entitlements may be configured to be server-specific (e.g., the user can only exchange data amongst servers of a designated rating), date and/or time-specific (e.g., the user can only exchange data on prescribed dates and/or during prescribed times).

Moreover, once the data connection has been authorized to be established, request management 202 is configured to determine a protocol to assign to the data exchange/transaction. The assigned protocol may be based on the type of data being exchanged, the ratings of the servers being used in the data exchange/transaction and any other criteria relevant to the data exchange/transaction or data connection. In this regard, more secure protocols may be implemented if the data exchange involves sensitive/restricted and/or non-public information.

Billing management 206 is configured to automatically determine the volume of data being moved/transferred, apply a billing rate to the data being moved/transferred, determine a billing entity associated with the data and communicate billing data (e.g., invoice) to the billing entity. Provisioning management 208 is configured to work in unison with the provisioning service 406 in the common core services 402 of the delivery service application 400 to provide a unified approach to provisioning new modules and updates/revisions to existing modules. Such provisioning management includes determining deployment times and schedules and the like. Operational status management 210 includes providing a user interface that is configured to provide real-time access to tracking data and performance metrics, such as real-time tracking of data movement/file transfer within the enterprise.

Referring to FIG. 3 a block diagram is presented of an apparatus 500, which is configured for providing technology/OS-agnostic and protocol-agnostic delivery of services within an enterprise, in accordance with embodiments of the present invention. In addition to providing greater detail, FIG. 3 highlights various alternate embodiments of the invention. The apparatus 200 may include one or more of any type of computing device, such as a server or the like. The present apparatus and methods can accordingly be performed on any form of one or more computing devices.

The apparatus 500 includes computing platform 502 that can receive and execute algorithms, such as routines, and applications. Computing platform 502 includes memory 504, which may comprise volatile and non-volatile memory, such as read-only and/or random-access memory (RAM and ROM), EPROM, EEPROM, flash cards, or any memory common to computer platforms. Further, memory 504 may include one or more flash memory cells, or may be any secondary or tertiary storage device, such as magnetic media, optical media, tape, or soft or hard disk. Moreover, memory 504 may comprise cloud storage, such as provided by a cloud storage service and/or a cloud connection service.

Further, computing platform 502 also includes processor 506, which may be an application-specific integrated circuit ("ASIC"), or other chipset, processor, logic circuit, or other data processing device. Processor 506 or other processor such as ASIC may execute an application programming interface ("API") (not shown in FIG. 3) that interfaces with any resident programs, such as service delivery application 400 and routines, sub-modules associated therewith or the like stored in the memory 504 of the apparatus 500.

Processor 506 includes various processing subsystems (not shown in FIG. 3) embodied in hardware, firmware, software, and combinations thereof, that enable the functionality of apparatus 500 and the operability of the apparatus on a network. For example, processing subsystems allow for initiating and maintaining communications and exchanging data with other networked devices, such as hub server (10 of FIG. 1). For the disclosed aspects, processing subsystems of processor 506 may include any subsystem used in conjunction with service delivery application 400 and related algorithms, sub-algorithms, modules, sub-modules thereof.

Computer platform 502 may additionally include communications module (not shown in FIG. 3) embodied in hardware, firmware, software, and combinations thereof, that enables communications among the various components of the apparatus 500, as well as between the other networked devices. Thus, communication module may include the requisite hardware, firmware, software and/or combinations thereof for establishing and maintaining a network communication connection.

The memory 504 of apparatus 500 stores service delivery application 400 that is a modular-based, operating-system agnostic and protocol-agnostic means for providing services throughout an enterprise. In this regard, since the services that are provided are not tied to any one operating system or any one protocol, the service delivery application eliminates the need for the enterprise to execute and maintain a multitude of operating system-specific and protocol-specific service applications. As such, the service delivery application is instrumental in decreasing overhead costs associated with maintaining the multitude of diverse service applications. For example, the data transfer module 414 included in the service delivery application 400 eliminates the need for the enterprise to execute, maintain and ensure compatibility numerous different file transfer applications that may be specific to operating systems/hardware and operating using specific file transfer protocols.

In addition, the modular-based service delivery application 400 provides for comprehensive and unified management over the services delivered by the application 400. Such unified and comprehensive management of the services is accomplished by the common core services 402 included in the application 400. The common core services 402 are common to all of the modular services 404 in the application 400. The core services may include, but are not necessarily limited to, provisioning 406, security 408, reporting 408, governance 410, tracking 411 and auditing 412. These core services may be applied to any of the modular services to which the core service is applicable. The application may be configured such that a user has access to one or more user-interfaces/dashboards that allow for the user to manage and/or view the common core services. The user-interface/dashboard may be configured to be specific to a common core service (e.g., such that each common core service UI/dashboard provides access to and control over each of the modular services 404) and/or specific to a modular service (e.g., such that each modular service UI/dashboard provides access to and control over each of the common core services for the specified modular service).

The provisioning service 406 is configured to provide for uniform deployment of new modular services 404 and deployment of revisions/updates to existing modular services 404. The security service 408 is configured to provide uniform control over the security features applicable to the modular services 404. In this regard, the security service 408 provides uniform rules, regulations and procedures for security. For example, the security service 408 provides uniform rules related to authenticating a protocol/module, uniform rules associated with encryption, uniform rules for resolving a security conflict or the like. The reporting service 410 provides uniform control over reporting functions associated with the modular services. For example, the reporting service 410 provides uniform control over what reporting is required, the contents of reports, parties receiving reports, and the like.

The governance service 412 is configured to provide uniform control over governance including, but not limited to, rules, regulations and procedures for rule exceptions, approval chains for granting exceptions and the like. The tracking service 411 is configured to provide uniform control and management over tracking functions associated with the modular services; such as, but not limited, tracking file transfer/data movement throughout the enterprise. The auditing service 413 is configured to provide uniform control auditing requirements, such as, but not limited to, auditing procedures, auditing schedules and the like.

The modular services 404 provided by service delivery application 400 are dictated by the needs of the enterprise and, therefore, will vary from enterprise-to-enterprise. In addition, since the system is modular-based additional modules can be inserted into the application 400 on an as needed basis. In specific embodiments of the invention, the modular services 404 included in the application 400 include file transfer/movement module 414 that is configured to provides a unified open-source approach to moving data (e.g., file transfers, conducting transactions and the like) to and from devices (e.g., servers) and/or applications deployed in the enterprise. In this regard, the file transfer/movement module 414 is configured to establish protocol-agnostic data connections 508 between networked devices (e.g., services) or applications residing in networked devices and to initiate data movement, file transfers, transactions via the established data connections.

As previously noted, the file transfer/data movement module 414 is configured to provide one consolidated methodology for accessing different operating systems and networked devices to move data to and from networked devices. As such, the file transfer/data movement module 414 provides a full-service, holistic approach that can be implemented enterprise-wide; obviating the need to deploy and maintain numerous disparate protocol and operating system-specific file transfer applications.

Moreover, in additional embodiments of the invention, the file transfer/movement module 414 is configured to provide server-level entitlements 510, as opposed to granting entitlements at the user-level. In this regard, the file transfer/module 414 looks at whether movement of data is permissible from device-to-device and/or application-to-application. A user is granted access to the file transfer/movement module 414 and may be pre-configured to perform certain actions within the file transfer/movement module 414 (i.e., the user has access at the application/module-level and may be provided granular access to perform specific actions only). If two network devices and/or two applications are configured so to be entitled for data transfer (i.e., entitled for a data connection/file transfer) any module user, pre-configured to use the module and perform the requisite function, can request data movement/file transfer between the devices and/or applications. In this regard, unlike conventional, file transfer applications, the user is not required to have nor are they provided physical access to the devices from which data is communicated and/or received.

In additional embodiments of the invention, the file transfer/movement module 414 is configured to implement a device/server rating system 512 as a means of determining whether the devices are entitled for a data connection (e.g., whether the devices can exchange data/conduct transactions or the like). In specific embodiments of the invention, the rating system may be based on the type of data that a device is configured to send or receive (e.g., confidential data, proprietary data, public data and the like). In other specific embodiments of the invention, a secondary rating may be provided to account for the geographic location of the device within the enterprise (taking into account that certain geographic locations/countries may have rules/laws in place restricting the type of data that may be communicated/received within the countries geographic locale/boundaries).

In accordance with other embodiments of the invention, additional optional modular services 404 may include web services module 418, messaging module 416, data archiving module 420 and any other service module 422. Web services module 418 is configured to provide a unified open-source approach to enabling legacy applications that do not include web services with web services capabilities. In this regard, the web service module 418 communicates with the legacy application to create a web services interface and/or provide a web browser. The web services module 418 is configured to provide one consolidated methodology for accessing different operating systems and networked devices enable legacy applications with web services capabilities. Messaging Module 416 provides a unified open-source approach to message brokering/queuing. The messaging module 416 may comprise message-oriented middleware that supports sending and receiving messages between distributed systems. The messaging module allows application modules to be distributed over heterogeneous platforms and reduces the complexity of developing applications that span multiple operating systems and network protocols. The module 416 creates a distributed communications layer that insulates the module from specifics of operating systems and network interfaces. Data archiving module 420 is configured to provide a unified open-source approach to data archiving. The data archiving module 420 is configured to provide one consolidated methodology for accessing different operating systems and networked devices to archive data.

Referring to FIG. 4 a block diagram is presented of an apparatus 600, which is configured managing services delivered by a technology/OS-agnostic and protocol-agnostic service delivery application within an enterprise, in accordance with embodiments of the present invention. In addition to providing greater detail, FIG. 4 highlights various alternate embodiments of the invention. The apparatus 600 may include one or more of any type of computing device, such as a server or the like. The present apparatus and methods can accordingly be performed on any form of one or more computing devices.

The apparatus 600 includes computing platform 602 that can receive and execute algorithms, such as routines, and applications. Computing platform 602 includes memory 604, which may comprise volatile and non-volatile memory, such as read-only and/or random-access memory (RAM and ROM), EPROM, EEPROM, flash cards, or any memory common to computer platforms. Further, memory 604 may include one or more flash memory cells, or may be any secondary or tertiary storage device, such as magnetic media, optical media, tape, or soft or hard disk. Moreover, memory 604 may comprise cloud storage, such as provided by a cloud storage service and/or a cloud connection service.

Further, computing platform 602 also includes processor 606, which may be an application-specific integrated circuit ("ASIC"), or other chipset, processor, logic circuit, or other data processing device. Processor 606 or other processor such as ASIC may execute an application programming interface ("API") (not shown in FIG. 4) that interfaces with any resident programs, such as service delivery management framework/application 200 and routines, sub-modules associated therewith or the like stored in the memory 604 of the apparatus 600.

Processor 606 includes various processing subsystems (not shown in FIG. 4) embodied in hardware, firmware, software, and combinations thereof, that enable the functionality of apparatus 600 and the operability of the apparatus on a network. For example, processing subsystems allow for initiating and maintaining communications and exchanging data with other networked devices, such as servers (20 of FIG. 1). For the disclosed aspects, processing subsystems of processor 606 may include any subsystem used in conjunction with service delivery management framework/application 200 and related algorithms, sub-algorithms, modules, sub-modules thereof.

Computer platform 602 may additionally include communications module (not shown in FIG. 4) embodied in hardware, firmware, software, and combinations thereof, that enables communications among the various components of the apparatus 600, as well as between the other networked devices. Thus, communication module may include the requisite hardware, firmware, software and/or combinations thereof for establishing and maintaining a network communication connection.

The memory 604 of apparatus 600 stores service delivery management framework/application 200 that is a web services framework which serves to integrate and connect the services provided by the service delivery application 400 (shown in FIG. 3). Request management 202 may include configuring the service, verifying security and compliance, verifying/receiving requisite approval chain and the like.

In specific embodiments of the invention, request management 202 is configured to manage data transmission ratings 608, such that each server 610 in the distributed network implemented enterprise-wise is assigned a data transmission rating 612. Further, in specific embodiments of the invention, managing data transmission server ratings includes automatically revoking or downgrading a server rating in response to determining that the server is non-compliant or otherwise vulnerable. For example, if the server is not executing the current revision of the security software or the like, the server may be automatically marked as not in good standing for its rating (i.e., the rating is temporarily revoked or the server is downgraded to a lower rating).

Further, request management 202 is configured to implement the data transmission ratings 612 to determine whether a data connection 616 is authorized to be established between two or more of the servers 610 based on the rating 612 assigned to the servers 612. In specific embodiments, request management 202 will receive a request to exchange data between specified two or more servers 610 and, subsequently, determine if the servers are authorized to exchange data based on the rating 612. If the two or more servers 610 are not compatible for data exchange, request management 202 may suggest two or more servers 610 that are compatible for data exchange. In other embodiments of the invention, request management 202 will receive a request, which does specify the servers but includes data exchange criteria (e.g., locations, type of data and the like) and, subsequently, determine two or more servers 610 that are compatible for the data exchange based on the ratings.

As previously discussed, the data transmission server rating 612 may provide for a primary rating 618 that is based on data type 620 that the server is authorized to exchange (i.e., receive and/or transmit). In specific embodiments of the invention, a lowest rated server may associated with public data exchange, while a highest rated server may be associated with restricted/highly sensitive non-public data exchange. For example, the rating system may assign ratings "1" through "9" based on type of data that the server is authorized to exchange.

Further, the data transmission rating 612 may provide for further classifications within the rating system, such as a secondary rating 622 that is based on the physical/geographic location 624 of the server. Ratings based on physical/geographic location take into account that countries (or regions) may have certain laws/regulations in place that restrict data movement outside of the country. For example, certain countries may prohibit NPI data from being transmitted to another country and/or received from another. Additionally, data transmission rating 612 may include further classifications, such as tertiary rating 626 that is based on other criteria 6128 associated with the data, the servers or the like. Thus, as previously noted, in those embodiments in which the rating system includes different classification of server ratings (i.e., secondary, tertiary and so on in addition to a primary classification) each of the classifications must be determined to be authorized for establishing a data connection in order for data exchange to occur.

Further request management 202 may be configured to determine whether a data request can be established based on other predetermined criteria, such as user permissions 630, date/time 638 and any other criteria 640. As previously discussed, user permissions 630 are preconfigured at the application level (e.g., modular service delivery application 400, and, more specifically, the file transfer/movement modular 414) and, since the user does not actually access the servers that exchange data, the user is not required to be entitled at the server-level (i.e., no need to set-up, and maintain individual entitlements at the server-level). User permissions/entitlements may be configured to be server-specific 632 (e.g., the user can only exchange data amongst servers of a designated rating), date and/or time-specific 634 (e.g., the user can only exchange data on prescribed dates and/or during prescribed times).

Additionally, request management 202 is further configured, once the data connection 616 has been authorized to be established, to determine a protocol 642 to assign to the data exchange/transaction. The assigned protocol 642 may be based on the type of data being exchanged, the ratings of the servers being used in the data exchange/transaction and any other criteria relevant to the data exchange/transaction or data connection. In this regard, more secure protocols may be implemented if the data exchange involves sensitive/restricted and/or non-public information.

Thus, systems, apparatus, methods, and computer program products described above provide for management over data movement/transfer by employing a data transmission rating system that assigns a data transmission rating to each server in the enterprise-wide communication network and subsequently makes determinations as to whether a data connection can be established between two or more servers based, at least in part, on the assigned data transmission rating. Specifically, the servers may be assigned a primary data transmission rating based on the type of data that the server is authorized to exchange and, optionally, the servers are assigned a secondary data transmission rating (or a tertiary rating and so on) based on the geographic/physical region/location of the server (e.g., the country where the server is located). In this regard, in order for a data connection to be established between the two or more servers, the primary rating, and in those embodiments that implement a secondary rating, a tertiary rating and so on, must be determined to be compatible.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for transferring data and conducting transactions amongst a network of enterprise-wide servers, the system comprising:
   a distributed network of servers, wherein each server has an assigned data transmission rating, wherein the data transmission rating is based at least on a type of data that a server is authorized to exchange;
   an operating system-agnostic, modular-based, service delivery application stored in network memory, executable by a processor and including a data transfer module configured to establish data connections between a plurality of servers in the enterprise; and
   a service delivery management application stored in network memory, executable by a processor and configured to manage services delivered by the service delivery application, including manage assignment of data transmission ratings to each of the servers and determine whether a data connection can be established between two or more of the servers for transferring data or conducting a data transaction based at least on the data transmission rating assigned to the servers.

2. The system of claim 1, wherein the service delivery management application is further configured to manage assignment of data transmission ratings including revoking a rating in automatic response to determining that the server is non-compliant or vulnerable.

3. The system of claim 1, wherein the service delivery management application is further configured to assign a protocol for the data connection established between the two or more servers.

4. The system of claim 1, wherein the service delivery management application is further configured to determine whether the data connection can be established between two or more of the servers for transferring data or conducting a data transaction based on permissions granted to a user of the data transfer module at a data transfer application level.

5. The system of claim 4, wherein the service delivery management application is further configured to determine whether a data connection can be established between two or more of the servers for transferring conduct or conducting a data transaction based on the permissions granted to the user of the data transfer module, wherein the permissions are at least one of server-specific and time-specific.

6. The system of claim 4, wherein the service delivery management application is further configured to manage whether a data connection can be established between two or more of the servers absent the user having entitlement at a server-level.

7. The system of claim 1, wherein each server in the distributed network of servers includes a primary data transmission rating that is based on the type of data that the server is authorized to exchange.

8. The system of claim 7, wherein each server in the distributed network of servers includes the primary data transmission rating that is based on the type of data that the server is authorized to exchange, wherein the type of data includes one or more of public data, aggregated data, highly sensitive non-public data and restricted data.

9. The system of claim 7, wherein a plurality of the servers in the distributed network of servers includes a secondary data transmission rating that is based on a physical location of the server.

10. The system of claim 9, wherein the service delivery management application is further configured to determine whether a data connection can be established between two or more of the servers based on compatibility of both the primary transmission rating and the secondary transmission rating.

11. An apparatus for transferring data and conducting transactions amongst a network of enterprise-wide servers, the apparatus comprising:
 a computing platform including a memory and at least one processor;
 an operating system-agnostic, modular-based, service delivery application stored in the memory, executable by the processor and including:
  a data transfer module configured to establish data connections between a plurality of servers in the enterprise; and
 a service delivery management application stored in the memory, executable by the processor and configured to manage services delivered by the service delivery application, including manage assignment of data transmission ratings to each server in the network of enterprise-wide servers, wherein the data transmission rating is based at least on a type of data that a server is authorized to exchange, and determine whether a data connection can be established between two or more of the servers for transferring data or conducting a data transaction based at least on the data transmission rating assigned to the servers.

12. The apparatus of claim 11, wherein the service delivery management application is further configured to manage assignment of data transmission ratings including revoking a rating in automatic response to determining that the server is non-compliant or vulnerable.

13. The apparatus of claim 11, wherein the service delivery management application is further configured to determine whether the data connection can be established between two or more of the servers for transferring data or conducting a data transaction based on permissions granted to a user of the data transfer module at a data transfer application level.

14. The apparatus of claim 13, wherein the service delivery management application is further configured to determine whether a data connection can be established between two or more of the servers for transferring conduct or conducting a data transaction based on the permissions granted to the user of the data transfer module, wherein the permissions are at least one of server-specific and time-specific.

15. The apparatus of claim 13, wherein the service delivery management application is further configured to manage whether a data connection can be established between two or more of the servers absent the user having entitlement at a server-level.

16. The apparatus of claim 11, wherein the service delivery management application is further configured to manage assignment of data transmission ratings including assigning each server a primary data transmission rating that is based on the type of data that the server is authorized to exchange.

17. The apparatus of claim 16, wherein the service delivery management application is further configured to manage assignment of data transmission ratings including assigning each server the primary data transmission rating that is based on the type of data that the server is authorized to exchange, wherein the type of data includes public data, aggregated data, highly sensitive non-public data and restricted data.

18. The apparatus of claim 16, wherein the service delivery management application is further configured to manage assignment of data transmission ratings including assigning a plurality of the servers a secondary data transmission rating that is based on a physical location of the server.

19. The apparatus of claim 18, wherein the service delivery management application is further configured to determine whether a data connection can be established between two or more of the servers based on compatibility of both the primary transmission rating and the secondary transmission rating.

20. A computer program product comprising:
 a non-transitory computer-readable medium comprising:
  a first set of codes for causing a computer to manage assignment of data transmission ratings to each server in a network of enterprise-wide servers, including assigning each server a primary data transmission rating that is based on a type of data that the server is authorized to exchange; and
  a second set of codes for causing a computer to determine whether a data connection can be established between two or more of the servers, for a purpose of transferring data or conducting a data transaction, based at least on the data transmission rating assigned to the servers.

* * * * *